Figure 1:
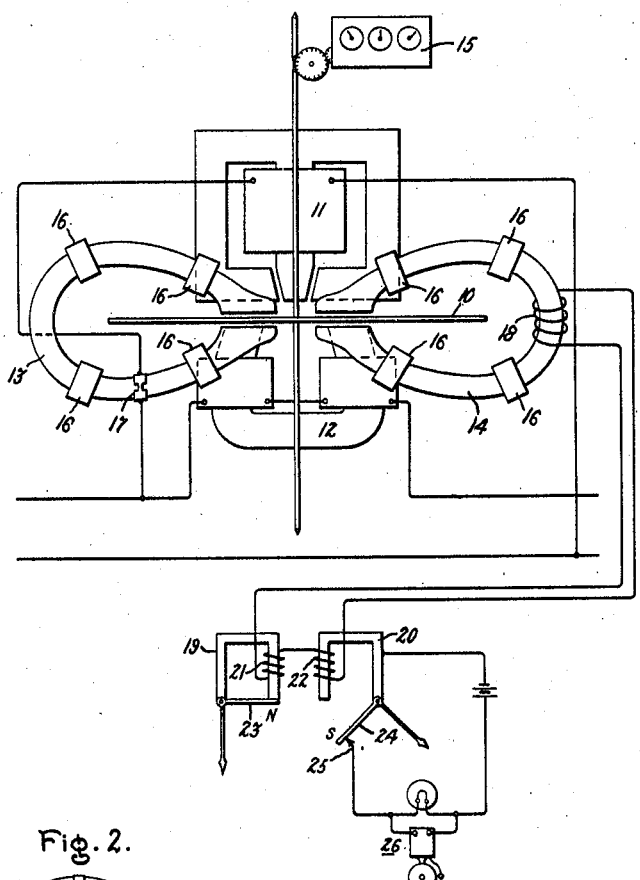

March 25, 1941.   G. R. STURTEVANT   2,236,277
PROTECTION OF PERMANENT MAGNETS IN METERS
Filed April 14, 1939

COPPER PLATED

TEMPERATURE SENSITIVE PAINT    COPPER PLATED

Inventor:
George R. Sturtevant,
by Harry E. Dunham
His Attorney.

Patented Mar. 25, 1941

2,236,277

UNITED STATES PATENT OFFICE 2,236,277

PROTECTION OF PERMANENT MAGNETS IN METERS

George R. Sturtevant, Lynn, Mass., assignor to General Electric Company, a corporation of New York Application April 14, 1939, Serial No. 267,827

5 Claims. (Cl. 177—311)

My invention relates to permanent magnets such as those used in meters and instruments and particularly the permanent drag magnets used in integrating meters, such as the common induction watthour meter.

Watthour meter drag magnets, as the name implies, are provided to retard the meter speed and cause the speed to be proportional to the power flow through the meter. It is important that the strength of the damping magnet remain unchanged throughout the useful life of the meter because if the drag magnets become weaker after the meter is calibrated and put into service the meter will have an error and will run too fast.

It has been the common practice to partially demagnetize permanent magnets before using them in watthour meters. This process is called "knock-down." It is also customary to age them by subjecting them to various high temperatures over a considerable period of time until their magnetic strength becomes constant before using them in watthour meters. Also, in some cases it has been the practice to separate the current windings of the meter from the drag magnets by a magnetic shield. These expedients are beneficial and my invention does not contemplate any material change in such expedients. The drag magnets of present day watthour meters are generally satisfactory except in cases where the meter windings or some adjacent conductor is subjected to unusual surge currents such as might be occasioned by lightning. In recent years "plug in" or socket type watthour meters have been used to some extent. Such a meter is describeed in U. S. Patent 2,105,396, January 11, 1938, to Hans A. Bakke. With such meters the neutral wire of the system is sometimes carried through the meter box or socket in close proximity to the drag magnets. In some localities it is a requirement that the neutral wire be grounded at or near the meter. In such installations it is not unknown for lightning surges flowing in the neutral wire to cause partial demagnetization of meter drag magnets resulting in very substantial meter errors. Against such occurrences the known expedients of "ageing," "knock-down" and magnetic shields do not prevent further weakening of the meter drag magnets and resulting meter error.

It is the primary object of my invention to provide substantial protection to the drag magnets of watthour meters from the effects of steep wave front current surges such as are caused by lightning. While such demagnetizing forces do not necessarily occur often or on all watthour meters, they do occur unexpectedly and when they do occur, they can destroy the meter accuracy and in a way that heretofore has been detected only by recalibration tests of the meter, often times after the meter has been inaccurate for several months. A further object of my invention is to provide a positive indication that a serious disturbance of this character has occurred in order that the accuracy of the meter may be checked promptly.

In carrying my invention into effect, I place one or more bands of conducting material around the flux axis of the permanent magnet or magnets such that currents are induced in such conductors when there is a change in flux of the permanent magnet, which currents oppose the flux change and in most cases keep it below a value which permanently alters the strength of the magnet. In addition I may cause the current flow in such protective current conductors to operate an indicator to call attention to the fact that a serious disturbance has occurred in order that the meter may be tested and corrected or replaced by a correct meter promptly.

Figure 2:
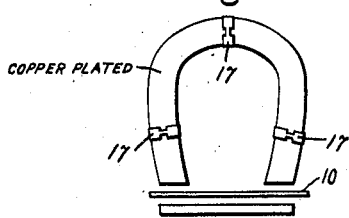
Figure 3:
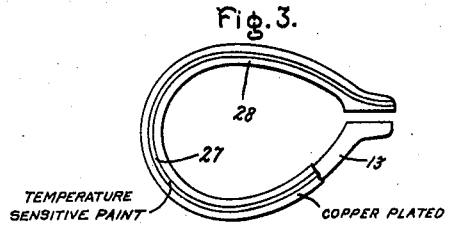
Figure 4:
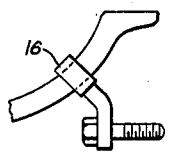

The features of my invention which are believed to be novel and patentable will be pointed out in the claims appended hereto. For a better understanding of my invention reference is made in the accompanying description to the accompanying drawing in which Fig. 1 represents the essential parts of a watthour meter to which my invention has been applied to the drag magnets thereof; Fig. 2 is a drag magnet having a single continuous conductor band such as copper plating thereon; Fig. 3 represents another drag magnet to which the invention is applied, and Fig. 4 shows a combined protective conductor and holding lug.

Referring now to Fig. 1, 10 represents a rotary disk armature of conducting material which is driven by induction by the fluxes produced by the voltage magnet 11 and the current magnet 12. The damping magnet system, shown as comprising the permanent magnets 13 and 14, produces a constant flux through disk 10 to provide a suitable retarding force to make the meter speed proportional to watthours, which are registered on a register 15. The customer usually pays a charge for the use of electricity depending upon the number of watthours registered per month. The meter must be and remain accurate within certain limits at various loads in order to satisfy the customer, the electric supply company and the public service commission or other regulating body.

It is evident that if during its normal use the meter drag magnets 13 or 14 or both become weaker, the meter will run too fast, and if this is not discovered immediately, the customer will pay more than the amount agreed upon for the use of electricity.

Short circuit surges and surges caused by lightning in the meter coils or in conductors closely adjacent the meter are sometimes so severe that the stray fluxes caused thereby demagnetize the drag magnets. The present invention in a large measure protects the drag magnets from becoming demagnetized by such surges and in case of failure to give such protection, is helpful in providing a visible indication that a harmful surge has occurred.

During the preparation of meter drag magnets for use they are first fully permanently magnetized and subsequently knocked down or partially demagnetized. Chrome steel drag magnets may, for example, be given an alternating current knock down equivalent to approximately 15 ampere turns of developed length of the magnet. If, then, during their life as drag magnets on a watthour meter they are not subjected to flux changes in excess of that received during the preparatory knock down and have otherwise been properly prepared, they should remain of constant strength. If, however, while in use, they are subjected to fluxes in excess of that received during the preparatory knock down, their strength will be altered. A surge flux change in a direction to increase the strength of the drag magnet must be greatly in excess of a surge flux change in a direction and of a magnitude to decrease the strength of the magnets for obvious reasons and hence where any change occurs due to surge fluxes it is almost invariably a weakening of the permanent magnet. These damaging flux changes are also usually very sudden. Hence, I provide means for opposing sudden flux changes through the permanent magnets and in this way have in a large measure protected the drag magnets from demagnetizing surges.

In accomplishing this result I provide one or more closed bands of conducting material about the permanent magnets, such as shown at 16 in Fig. 1. Any sudden change in flux through such closed circuited conductor will produce a current therein which opposes such change in flux. The greater the time rate of change of flux the greater will be the current induced in the short circuited conductor and the greater will be the opposing force. As a result the flux change is choked back and is partially diverted to some other path outside of the closed conductor and outside the permanent magnet. If, now, such means is effective in preventing flux changes through the permanent magnet which are in excess of the original knock down flux change, it will be effective in protecting the magnet. It is evident that appreciable current may be induced in the short circuited bands 16 before there is any demagnetizing of the permanent magnets because the permanent magnets were, in their preparation, made immune to flux changes up to a certain point by the initial knock down. Thus, the opposing force to flux changes is set up by current flow in bands 16 before the flux change is great enough to cause damage and the scheme is effective in preventing any permanent change in the strength of the drag magnets by many of the surges which would otherwise produce serious meter errors.

Also, fortunately, surge fluxes generally have a very high rate of change and the higher the rate of change the more effective are the closed bands in preventing demagnetization of the drag magnets. For example, let us suppose that it requires a flux change $\phi$ to produce demagnetization. If this flux change occurs slowly, the current induced in the closed band will be small and will offer little opposition to the change. However, if the change in flux $\phi$ occurs suddenly, the currents induced in bands 16 will be great and the opposing force will be great. Thus surge fluxes are generally of such a character that the closed bands 16 operate at high efficiency, for the purpose for which they are intended and give valuable protection against steep wave front surges.

No one can accurately predict the magnitude and character of a surge that at some time may occur in or adjacent a meter and hence the invention as a protective device has its limitations. Of course, the more conductor material 16 we place about the magnets 13, the greater will be the protection, but there are practical and economical limits beyond which it would be unwise to go in this direction.

The amount of such protection desirable will depend in a large measure on the coercive force material used in the permanent magnets and the extent to which they are originally knocked down and otherwise protected from surge fluxes. If, for example, the drag magnet is of the character described in copending application Serial No. 207,534, filed May 12, 1938, Patent No. 2,196,898 issued April 9, 1940 to Faus and assigned to the same assignee as the present invention, very much less protection of the character here described will be required, if it is needed at all.

Steep wave front surges may occur which rise to such magnitude that the protection such as represented in Fig. 1 will not be sufficient to prevent some demagnetization of the drag magnets, although it will reduce the damage done. In such cases, it will be desirable to provide an indication that a demagnetizing surge has occurred and the present invention is readily adapted for that purpose. For example, the bands 16 may be coated with a low melting point colored wax or other coating which will melt or change color when the current induced in the bands rises to such a point as to heat the conductor and cause the coating to respond as an indicator. Such indicator should respond to surges beyond which the protection is not likely to be fully effective. Then the meter may be promptly tested and recalibrated or replaced, if it is inaccurate. The bands or a special band 17 particularly designed for indicating purposes may be in the form of a fuse which will melt to give the desired indication. Another form of indicator may comprise a secondary coil 18, Fig. 1, closed through magnetic relays 19 and 20.

The coils 21 and 22 of the relays are similarly wound and connected in series or parallel to coil 18. These relays have oppositely polarized armatures 23 and 24 which armatures normally hold themselves in the energized position as shown for armature 23, but adjusted so that surges of the proper polarity and amount will release such armatures. Thus a surge that produces a south pole at the lower end of coil 22 will repel armature 24 and it will move by gravity to the indicating position shown. An opposite polarity surge will release armature 23. When so released it may close a contact 25 of an alarm 26 or other relay circuit as indicated. In all of these indicating devices the closed band or circuit is present and to the extent to which it is effective, it also gives the protection described above.

In Fig. 2 I have shown a form of watthour meter drag magnet described in United States Patent 2,110,418, March 8, 1938, to Green, and made of the high coercive force material known by the trade designation of Alnico and containing about 20% nickel, 12% aluminum, 5% cobalt and the remainder largely iron. Green suggests using an initial knock down of 250 to 300 ampere turns, alternating current or approximately 83 to 100 ampere turns per inch. Where this drag magnet is placed as close to the meter coils as is disclosed in the Green patent, my invention is useful thereon. In relatively small magnets of this design, the protective conductor may take the form of a single continuous band such as copper plating. The magnet is therefore coated with copper except at the gap pole faces with the coating being of a thickness of about 15 mills although for certain applications different thickness may be necessary. This coating may be put on the magnet by what is known as the "Schooping" process in which the molten metal is sprayed on the magnet. In addition, the magnet may be provided with one or more fusible indicator bands 17.

In Fig. 3 I have represented a chrome steel drag magnet 13 having a continuous conductor band 28 of copper plating which will extend over the entire surface of the magnet except at the air gap pole pieces faces. The copper coating is preferably about 15 mills in thickness. Whether the protective conductor be in the form of a single band, as in Fig. 3, or several bands, as in Fig. 1, the conductor material should preferably be distributed so as to afford protection at all points of the magnet as surge fluxes have rather indefinite paths and do not necessarily follow throughout the length of the magnet structure.

In order to give a better idea of the protection afforded by my invention, it may be stated that tests have been made on the form of meter represented in Fig. 1 with and without the protection afforded by my invention and with surges purposely made such as to cause demagnetization of the magnets. Without my invention it was found, for example, that a surge equivalent to 45,000 ampere turns in the current coil of the meter affects a chrome steel magnet approximately 20 per cent. The same magnet protected by the shortcircuiting bands would only be affected approximately 4 per cent.

In Fig. 3 I have indicated at 27 a coating strip running continuously about the front of the magnet where it is visible. This paint or other coating is of a character that will change color or melt or fall off when heated by a current in conductor 28 caused by a surge flux which is likely to demagnetize the magnet. For lesser surges and currents in the conductor the indicator strip does not change. This affords a simple indication of the occurrence of probable damaging flux changes in any part of the magnet.

It is seen then that my invention affords protection against many surges that might otherwise render the meter inaccurate. It decreases the harmful effects of other surges against which it does not give full protection and it gives an indication of the occurrence of most surges likely to be harmful.

Certain of the protective conductor bands used in the form of the invention shown in Fig. 1 may also serve as the drag magnet holding lug, as indicated in Fig. 4.

While the invention has been described in connection with alternating current watthour meters, it is generally applicable to all metering devices using permanent magnets likely to become demagnetized by surge fluxes.

What I claim as new and desire to secure by Letters Patent of the United States is:

1. In an electric integrating meter, a rotary armature of conducting material, a permanent magnet for producing a constant damping flux through said armature and a closed circuit of conducting material about said permanent magnet in which a current will be induced by demagnetizing flux changes in said magnet and means responsive to the flow of current in said circuit for indicating the occurrence of a demagnetizing flux change.

2. In an induction watthour meter, a rotary armature of conducting material, a permanent magnet for producing a damping flux through said armature, said damping magnet having conducting material surrounding its flux axis for the purpose of opposing sudden flux changes therein, said conducting material including a fusible section designed to fuse and thereby produce an indication upon the occurrence of a demagnetizing flux change in said magnet.

3. In an induction watthour meter, a permanent damping magnet therefor, a coil in inductive relation with said magnet such that sudden flux changes in the magnet induces a current in said coil, an electromagnet connected to said coil to be energized thereby when a current is induced therein, and a polarized armature biased to a detracted position with respect to said electromagnet, said armature being normally attracted to said electromagnet by reason of the polarization of the armature but adapted to be released to move to a detracted position upon the occurrence of a flux change in said permanent magnet of a predetermined character.

4. In an electric meter of the integrating type, a permanent magnet for producing a restraining force for said meter, said magnet being plated with a layer of conducting material for opposing demagnetizing flux changes in said magnet and temperature sensitive color changing material on said conducting material for indicating the occurrence of a demagnetizing flux change in said permanent magnet.

5. In an induction watthour meter a permanent damping magnet for restraining the operation of said meter, said magnet being initially partially demagnetized for the purpose of making it immune to demagnetizing flux changes of a predetermined severity, conductor means in inductive relation to said magnet for opposing demagnetizing flux changes therein of greater severity, and means responsive to the current flow in said conductor means for indicating the occurrence of flux changes in said magnet of such severity as to cause demagnetization.

GEORGE R. STURTEVANT.